United States Patent [19]

Bartasis

[11] Patent Number: 4,924,525
[45] Date of Patent: May 15, 1990

[54] MULTILAYER FILM FOR CHEMICAL PROTECTIVE CLOTHING

[75] Inventor: James E. Bartasis, Gurnee, Ill.

[73] Assignee: Bodigard Technologies, Inc., Buffalo Grove, Ill.

[21] Appl. No.: 194,468

[22] Filed: May 16, 1988

[51] Int. Cl.$^5$ .............. A41D 13/00; B32B 27/08; B32B 32/00; B32B 36/00

[52] U.S. Cl. .................................. 2/2; 2/2.1 R; 2/2.1 A; 2/243 A; 428/480; 428/483; 428/516; 428/520

[58] Field of Search ............ 2/2, 2.1 R, 2.1 A, 243 A; 428/516, 520, 910, 480, 483

[56] References Cited

U.S. PATENT DOCUMENTS

| | | | |
|---|---|---|---|
| 2,981,954 | 5/1961 | Garbellano | 2/2.1 R |
| 3,112,300 | 11/1963 | Natta et al. | 525/240 |
| 3,294,617 | 12/1966 | Way | 2/2.1 R |
| 3,560,325 | 2/1971 | Sogi et al. | 428/216 |
| 3,620,435 | 11/1971 | Sogi | 229/3.5 R |
| 3,882,259 | 5/1975 | Nohara et al. | 428/36.7 |
| 4,082,854 | 4/1978 | Yamada et al. | 426/106 |
| 4,190,010 | 2/1980 | Bibby | 2/275 |
| 4,272,851 | 6/1981 | Goldstein | 2/79 |
| 4,478,070 | 3/1988 | Beehler | 428/516 |
| 4,522,203 | 6/1985 | Mays | 428/287 |
| 4,555,293 | 11/1985 | French | 264/248 |

FOREIGN PATENT DOCUMENTS

| | | | |
|---|---|---|---|
| 1306990 | 9/1962 | France | 2/2.1 R |
| 1476661 | 4/1967 | France | 2/2.1 R |
| WO83/03205 | 9/1983 | PCT Int'l Appl. | |

*Primary Examiner*—William J. Van Balen
*Attorney, Agent, or Firm*—Willian, Brinks, Olds, Hofer, Gilson & Lione

[57] ABSTRACT

An improved chemical protective garment is provided by first forming a multilayer film structure having an inner layer of substantially isotactic oriented polypropylene homopolymer sandwiched between a layer of ethylene-propylene random copolymer and a layer of ethylene-vinyl acetate. The multilayer film structure is then bonded to a two-layer polyester substrate using an elastomeric adhesive. In a preferred embodiment, a barrier material having a layer of ethylene-vinyl alcohol is combined with the multilayer film structure to form a composite, which is then combined with the substrate.

24 Claims, 1 Drawing Sheet

MULTILAYER FILM FOR CHEMICAL PROTECTIVE CLOTHING

RELATED APPLICATION

This application is a continuation-in-part of U.S. application Ser. No. 06/920,361, filed on Oct. 20, 1986, now abandoned, the entire disclosure of which is incorporated herein by reference.

FIELD OF THE INVENTION

This invention relates to improved protective garments. It relates particularly to disposable garments made of synthetic plastic materials.

BACKGROUND OF THE INVENTION

Many synthetic, cloth-like materials are used in protective garments of one type or another. These materials can be thermoplastic or thermoset and are formed in both woven and non-woven configurations. These synthetic cloth-like materials include "Tyvek" which is a trademark of E.I. Du Pont de Nemours and Co., Wilmington, Del. 19898; "Duraguard" and "Safeguard" which are trademarks of Kimberly Clark Corp., Roswell, Ga. 30076; "Celestra" which is a trademark of Crown Zellerback Corp., Washougal, Wash. 98671; and "Duralace" which is a trademark of Chicopee Manufacturing Co., Chicopee, Ga. 30501. These materials are utilized as substitutes for cloth and pulp-paper in disposable clothes for medical, industrial and retail markets, as well as for other purposes.

In addition to the foregoing, laminated materials comprising a film and a substrate are also known in protective garments As described in Goldstein U.S. Pat. No. 4,272,851, materials such as "Tyvek" are conventionally laminated to a film of polyethylene, for example, and made into protective garments. U.S. application Ser. No. 06/920,361, the entire disclosure of which is incorporated herein by reference, discloses a high barrier, multilayer polymer film structure laminated onto a substrate.

The migration by chemicals through a complex laminated material involves a sequence of process steps including sorption, diffusion, and desorption, the combination of which is defined as permeation. There are a number of factors which influence the rates that each of these process steps will occur, or whether each step will occur at all. The various factors which govern the permeation rates include degradation of the laminate by the chemical, temperature, pressure, thickness, solubility, stereochemistry, concentration, state, vapor pressure and viscosity, among other variables.

If the chemical from which protection is sought is a liquid, the rate-limiting step becomes diffusion, and the sorption and desorption effects can be neglected. This diffusion, under ideal circumstances, is governed by the solubility and stereochemistry of the chemical and the protective material relative to each other.

SUMMARY OF THE INVENTION

The present invention provides a polymer film structure for use in protective clothing which, due to its stereochemistry and solubility relative to most chemicals, provides improved user protection from a wide variety of chemicals along with improved physical properties. The polymer film structure of the invention comprises a substantially isotactic and oriented material which, because of its stereo-chemistry, tends to act as a lattice filter to most large molecules. Preferably, this substantially isotactic and oriented material is also nonpolar. However, because of the orientation, it is a very dense polymer having a well-ordered structure, thereby exhibiting relative insolubility with respect to both polar compounds and nonpolar compounds. Means are provided for preserving the isotactic and oriented characteristics of the filter material during combination with substrate or other film layers, thereby preventing degradation.

The chemical protective film structure of the invention can be combined directly with a substrate or, in a preferred embodiment, combined with a multilayer barrier structure, preferably containing a polar material, to form a composite which is then combined with a substrate. In the latter embodiment, the combined structure exhibits a synergistic effect whereby the chemical resistance of the composite is much greater than the sum of the individual resistances of the substantially isotactic material-containing structure and the polar material-containing structure. Furthermore, the substantially isotactic and oriented material increases the useful life of the polar material-containing structure by acting as a shield to certain chemicals which would otherwise attack the structure which contains the polar material, thereby causing a reduction in barrier properties.

One five-layer high barrier structure, for example, contains a center layer of ethylene vinyl alcohol (EVOH) bracketed on both sides by two layers of a moisture-resistant adhesive material which bond the EVOH to two outer layers of a polyolefin material such as polyethylene or polypropylene. EVOH serves as a high barrier layer but loses much of its barrier properties upon absorption of moisture. The adhesive layers react chemically with the EVOH to form an interpolymer network which both forms an adhesive bond and helps protect the EVOH from exposure to moisture, thus preserving the high barrier properties of EVOH in a moist environment. This interpolymer network renders even edge-cut material substantially impervious to moisture.

The adhesive materials used for bonding EVOH to polyolefins include, for instance, acid-anhydride polyethylene materials available from Amoco Chemical Corp. or British Petroleum Corp. Such adhesive materials are subject to attack from certain nonpolar chemicals such as methylene chloride, carbon disulfide, and benzene, causing degradation and some dissolution of the adhesive. When this happens, the moisture protection afforded the EVOH layer by the adhesive layers is lost.

When the substantially isotactic material-containing structure of the invention is laminated to the EVOH-containing structure to form a composite, the substantially isotactic and oriented material acts as a filter or shield for chemicals such as methylene chloride, carbon disulfide and benzene, which would otherwise migrate into the EVOH-containing structure and attack one or both adhesive layers. Surprisingly, the time required for these chemicals to migrate through the composite structure is much greater than the sum of the times required to migrate through the EVOH-containing structure and the isotactic material-containing structure, prior to their combination. In addition to providing much increased resistance to chemicals which attack the moisture-resistant adhesive layers bracketing the EVOH, the composite structure provides much increased resistance to other nonpolar and polar chemicals as well.

The preferred filter material for use with the present invention is a layer of oriented polypropylene homopolymer material having between about 90% to 97% isotactic polypropylene and between about 3% to 10% atactic polypropylene. Preferably, the polypropylene homopolymer film is biaxially oriented. Preferably, the polypropylene is sandwiched between two additional polymer layers, a heat seal layer and a primary adhesive layer. This can be accomplished using a coextrusion process prior to orientation. The entire three-layer structure will then pass through the orientation process, but only the polypropylene homopolymer accepts orientation.

By sandwiching the oriented polypropylene between a polymer heat seal layer and an adhesive material, means are provided both for laminating the multilayer structure to a substrate or barrier film to form a protective material and for heat sealing different segments of the protective material together. The most preferred material for use as a polymer heat seal layer is a random, ethylene-propylene copolymer having between about 93-97 propylene and about 3-7% ethylene content.

The primary adhesive material can be a urethane-based adhesive, an acrylic or latex-based material, an oil-based material, or a low melting polymer such as ethylene vinyl acetate (EVA). In some instances, a secondary adhesive may be laminated onto the primary adhesive layer to form a bond between the primary adhesive and the substrate whereby the primary adhesive provides for favorable lamination conditions while maintaining the orientation and isotactic properties of the polypropylene layer. When EVA is used as a primary adhesive, for instance, a secondary adhesive such as an elastomeric material can be laminated onto the EVA at a temperature which is low enough that the orientation and isotactic properties of the polypropylene are not disrupted.

Various methods may be utilized for combining the oriented polypropylene-containing structure with a polar material-containing barrier structure prior to combination with the substrate. These methods include thermal lamination and other lamination techniques. When a barrier structure containing EVOH bracketed between adhesive layers is utilized, the overall number of layers may be reduced by producing the entire composite structure in a single process. For example, a structure containing ethylene-propylene copolymer/polypropylene/adhesive/EVOH/adhesive/polyolefin may be first coextruded and then oriented, thereby eliminating intermediate layers of primary adhesive/secondary adhesive/polyolefin which would be present if the polypropylene-containing structure and the EVOH-containing structure were produced separately and then combined, as heretofore described.

When an oriented polypropylene-containing film and an EVOH-containing film are produced separately and then combined, the latter structure should preferably comprise outer layers of a polyolefin material, preferably polyethylene, which are bonded to the EVOH using the moisture-resistant adhesive layers. The first outer polyethylene layer can then be bonded to the primary adhesive layer of the oriented polypropylene-containing structure using, for instance, a thermal lamination process. Alternative methods of combination are also possible. In order to provide a material with acceptable tear properties suitable for use in a protective garment, the second outer polyethylene layer can be bonded directly to a single-layer polyester substrate by first "corona" treating the polyethylene layer as hereinafter described and then applying a suitable adhesive to the interface.

When an oriented polypropylene-containing film is bonded directly to a substrate using an adhesive, the substrate itself will preferably comprise two layers which have been combined prior to lamination onto the adhesive surface of the multilayer film. A first layer of spun-bonded polyester imparts excellent tear properties to the protective material. A second layer of nonwoven (powder bonded) polyester is utilized as a protective absorbent interface layer to help prevent the elastomeric adhesive from migrating into the first layer of spun-bonded polyester, thereby minimizing fiber lock and preserving the high-tear characteristics of the protective material. Generally, the less deeply the adhesive is allowed to penetrate the spun-bonded polyester, the less fiber lock will occur.

With the foregoing in mind, it is an object of the invention to provide a material for disposable chemical garments having improved resistance to chemicals.

It is a further object of the invention to provide a composite structure which has greatly improved chemical resistance and which retains its chemical resistance in a moist environment.

Still another object of the invention is to provide a material for disposable chemical garments and a method of making the same which has excellent tear strength, tensile strength, and other physical properties.

Yet another object is to provide a protective garment and a method of making the same which has much improved chemical resistance, which retains its chemical resistance over a longer period of time, and which is stronger and more durable than protective garments currently available.

BRIEF DESCRIPTION OF THE DRAWINGS

The invention, including its construction and method of fabrication, is illustrated more or less diagrammatically in the accompanying drawings, in which.

DETAILED DESCRIPTION OF THE PREFERRED EMBODIMENTS

Figure 1:
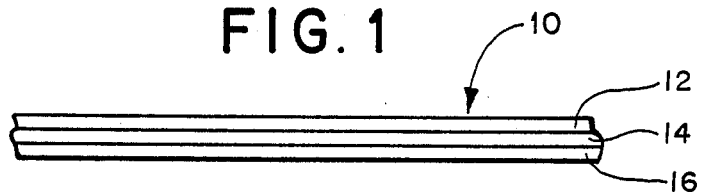
FIG. 1 is an enlarged sectional view of a multilayer film of the invention having a nonpolar, substantially isotactic inner layer.

Referring first to FIG. 1, a multilayer polymer film structure 10 includes a layer 14 of oriented polypropylene homopolymer having at least about 90% isotactic polypropylene sandwiched between a heat seal layer 12 and a primary adhesive layer 16, for instance, of ethylene-vinyl acetate copolymer material. The heat seal layer 12 is preferably a random ethylene-propylene copolymer having between about 93-97% propylene and about 3-7% ethylene by weight.

The multilayer polymer film structure 10 can be formed by first coextruding the layers 12, 14, and 16 together and then orienting the entire structure, preferably in both directions (biaxially). While the entire multilayer structure 10 is created initially, only the polypropylene homopolymer layer will retain the orientation. Preferably, the multilayer structure 10 has an overall thickness of between about 0.0007 inches and about 0.0014 inches.

Figure 2:
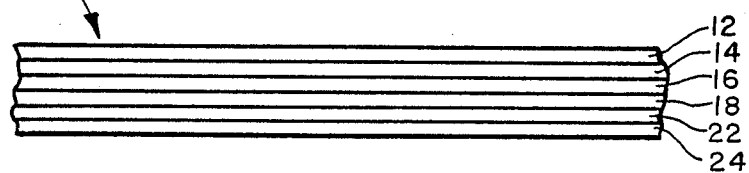
FIG. 2 is an enlarged sectional view of the film of FIG. 1 onto which a substrate has been laminated to form a protective material.

An adhesive layer 18, preferably elastomeric, is positioned adjacent to the outer surface of the ethylene vinyl acetate layer 16 during lamination of the film structure 10 with a substrate (FIG. 2). The adhesive layer 18, if elastomeric, helps prevent "fiber lock" when the film is later laminated to a substrate. Fiber lock occurs when individual filaments of a material behave as a single filament instead of independently. Fiber lock causes a reduction in tear strength of a material. If the adhesive is allowed to migrate into the high-tear substrate hereinafter described, fiber lock results, causing the composite structure to have a lower tear strength than the individual layers prior to combination. Fiber lock can be minimized by utilizing both an elastomeric adhesive and an intermediary substrate, as hereinafter described.

Referring now to FIG. 2, the multilayer film 10 is shown after lamination with adhesive layer 18 to substrate layers 22 and 24 to form a protective garment material 20. The outer substrate layer 24 is preferably a high tear, spun-bonded polyester which imparts excellent tear strength to the garment material 20. The interface substrate layer 22 is preferably a powder-bonded (nonwoven) polyester whose primary function is to serve as an absorbent for the adhesive 18 which would otherwise migrate toward and penetrate the spun-bonded polyester layer 24, causing a reduction in tear strength. When the layers are combined in the manner shown, the protective garment material 20 has a much higher tear strength than either the substrate layers 22 and 24 or the multilayer film layers 12, 14 and 16 had prior to the combination of the substrate and the multilayer film. Furthermore, the garment material has a "good hand", i.e., good feel, flexibility, wearability, etc.

Figure 3:
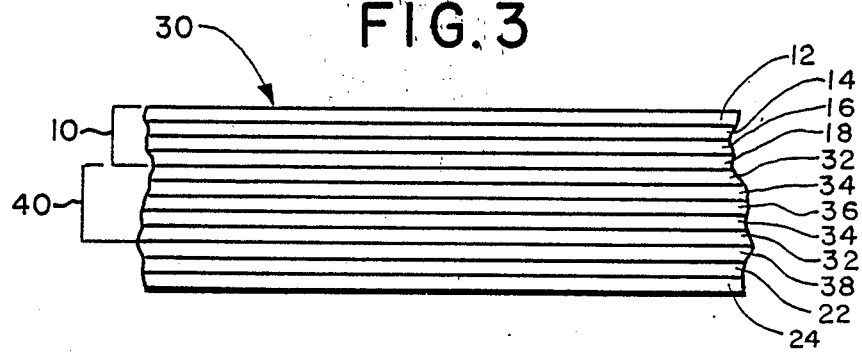
FIG. 3 is an enlarged sectional view of the film of FIG. 1 which has been combined with a high barrier film having an ethylene vinyl alcohol layer, and then laminated onto a substrate to form a protective material.

FIG. 3 shows a highly preferred embodiment in which a barrier film 40 having an ethylene vinyl alcohol (EVOH) layer 36 bracketed between two adhesive layers 34 has been combined with the multilayer film 10 prior to lamination with the substrate layers 22 and 24 to form a composite film generally designated as 30. The barrier film 40 also includes two outer layers 32 of a polyolefin material, such as polyethylene, which are bonded to the EVOH layer 36 using adhesive layers 34. The substrate layers 22 and 24 can be connected to a layer 32 of polyethylene by a suitable adhesive 38. The outer polyethylene layer 32 can be "corona" treated by a process well known in the art to cause improved adhesion between the polyethylene layer 32 and the nonwoven polyester layer 22. This corona treatment causes micro-etching of the polyethylene layer 32, thereby providing locations on the polyethylene surface to which the adhesive layer 38 can more easily form a bond.

When the multilayer film 10 is combined with a barrier film 40, a synergistic effect has been observed by which the chemical resistance of the resulting composite 30 is much greater than the sum of the resistances of the individual structures 10 and 40. Furthermore, the substantially isotactic, oriented polypropylene homopolymer layer 14 of the multilayer film 10 acts as a protective shield for the barrier structure 40 with respect to certain nonpolar chemicals such as methylene chloride, carbon disulfide, and benzene The layer 14 also acts as an additional barrier to moisture. These chemicals attack the adhesive layers 34 which surround the EVOH layer 36, causing the EVOH to become more vulnerable to moisture-induced degradation, which in turn causes a reduction in barrier properties of the EVOH.

Figure 4:
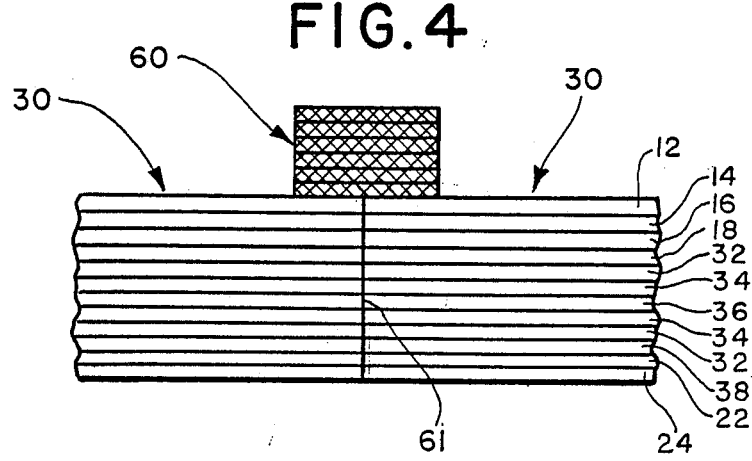
FIG. 4 is an enlarged sectional view of two segments of the protective material of FIG. 3 which have been combined using a strip of a polymer-containing material thermally bonded to both segments.

FIG. 4 shows an alternative method for combining two segments of a protective garment by which the segments of protective material 30 are joined in an abutting relationship and a seam 61 is formed between the two ends. A narrow strip 60 of the garment material is placed over the abutting material and is thermally bonded to both film segments 30 using, for instance, a heat seal process. The narrow strip 60 is preferably of the same material structure as the two segments 30 which are being joined together. The substrate layers present in the strip 60 serve as a heat sink during the thermal bonding process and can be removed from the strip after the thermal bonding process has been completed. Alternatively, the substrate layers may be left intact to impart additional strength to the seam 61.

The thermal bonding of the strip 60 may be carried out in the following manner. The strip 60 is heated by passing it over a Teflon roller heated to approximately 200° F. It is pressed against the Teflon roller by a urethane roller under a pressure of about four psi. Air is heated to approximately 440° F. and blown in a fine jet at the point where the 60 and the abutting edges of the segments 30 come together, between the strip 60 and the segments 30, before the material passes between the rollers.

Optimum conditions for thermal bonding will vary. In particular, as the sealing speeds are increased, the optimum conditions will change toward higher temperatures, higher pressure, and greater air volumes. By heat sealing the segments 30 of protective material, a thermal bond is formed between the segments 30 and the strip 60 in the vicinity of the seam 61. During formation of this thermal bond, the different layers of the segments 30 and strip 60 melt and mix together due to the heat and pressure which are applied.

During the melting and mixing, the heat seal layer 12 acts as a buffer to the oriented polypropylene homopolymer which is not itself a heat sealable material. The heat seal material must be miscible with the polypropylene homopolymer to act as a buffer. An ethylene-propylene random copolymer having about 93–97% propylene and about 3–7% ethylene is one example of a heat seal material is useful for this purpose.

The seam bond formed by this process is of high strength and durability. Furthermore, this bond is impervious to the hazardous environment. Alternatively, the segments 30 may be sewn together prior to combination with the strip 60 in order to simplify the thermal bonding process.

EXAMPLE 1

A film structure having a layer of substantially isotactic biaxially oriented polypropylene homopolymer sandwiched between a layer of random ethylene propylene copolymer and a layer of ethylene vinyl acetate was produced by first coextruding and then biaxially stretching the layers. The three-layer film structure, having a thickness of 1.2 mils, was then laminated to a polyester substrate having an interface layer of nonwoven polyester and an outer layer of spun-bonded polyester. The resulting material was tested according to ASTM Method F-739 for permeation by carbon disulfide. Testing was carried out using one-inch standard cells, a nitrogen flow rate to the cells of 100 cc/min., and a temperature of 30° C. The samples were analyzed by continuous photoionization detection using a 10.2 electron volt lamp and a detector temperature of 100° C. The steady state permeation rate was determined gravimetrically by collection of nitrogen flow on charcoal tubes. Three material samples were tested and the following results were obtained:

|  | Cell 1 | Cell 2 | Cell 3 |
| --- | --- | --- | --- |
| Sample Thickness | 8 mils | 8 mils | 9 mils |
| Breakthrough Time | 4 min. | 4 min. | 4 min. |
| Steady State Permeation Rate | 1120 μg/cm²-hr | 1430 μg/cm²-hr | 1110 μg/cm²-hr |
| Minimum Detection Limit | .30 ppm | .30 ppm | .30 ppm |
| Average Breakthrough Time: | 4 min. | | |
| Average Permeation Rate: | 1220 μg/cm²-hr | | |

EXAMPLE 2

A film structure having a layer of ethylene vinyl alcohol bracketed between two moisture-resistant adhesive layers and two outer layers of polyethylene was produced using a coextrusion process. The five layer film structure, having a thickness of 2.25 mils, was then laminated to a polyester substrate consisting of a layer of spun bonded polyester. The resulting material was tested according to ASTM Method F-739 for permeation by carbon disulfide. Testing was carried out using an FID detector having a temperature of 250° C., a permeation chamber temperature of 23° C. and a nitrogen flow rate to the cells of 35 ml/min. The samples were analyzed by gel chromatography using a 36 inch, 10% OV-101 glass column, a column temperature of 200° C., and a nitrogen carrier gas at a flow rate of 50 ml/min. Three material samples were tested and the following results were obtained:

|  | Cell 1 | Cell 2 | Cell 3 |
| --- | --- | --- | --- |
| Sample Thickness | .30 mm | .30 mm | .30 mm |
| Breakthrough Time | 11 min. | 2 min. | 2 min. |
| Steady State Permeation Rate | .2 mg/m²-sec | 1 mg/m²-sec | .6 mg/m²-sec |
| Minimum Detection Limit | .30 ppm | .30 ppm | .30 ppm |
| Average Breakthrough Time: | 5 min. | | |
| Average Permeation Rate: | .6 mg/m²-sec | | |

EXAMPLE 3

A first film structure having a layer of substantially isotactic biaxially oriented polypropylene homopolymer sandwiched between a layer of random ethylene propylene copolymer and a layer of ethylene vinyl acetate was produced by first coextruding and then biaxially orienting the layers. A second film structure having a layer of ethylene vinyl alcohol bracketed between two moisture resistant adhesive layers and two outer layers of polyethylene was produced using a coextrusion process. A single-step lamination process was then used to sandwich the second film structure, having a thickness of 2.25 mils, to the first film structure, having a thickness of 0.7 mils, and to a polyester substrate.

The resulting material was tested according to ASTM Method F-739-85 for permeation by carbon disulfide. Testing was carried out using an FID detector at a temperature of 250° C., LCV-4 cells at a temperature of 23° C., and a nitrogen flow rate to the cells of 5 ml/min. The samples were analyzed using a 10% OV-101 column, a column temperature of 175° C., and a carrier gas flow rate of 50 ml/min. Four material samples were tested and the following results were obtained:

|  | Cell 1 | Cell 2 | Cell 3 | Cell 4 |
| --- | --- | --- | --- | --- |
| Sample Thickness | 9.5 mils | 9.5 mils | 9.5 mils | 9.5 mils |
| Breakthrough Time | >8 hours | >8 hours | >8 hours | >8 hours |
| Permeation Rate | Undetectable (low) | Undetectable | Undetectable | Undetectable |
| Minimum Detection Limit | .30 ppm | .30 ppm | .30 ppm | .30 ppm |
| Average Breakthrough Time: | >8 hours | | | |
| Average Permeation Rate: | Undetectably low | | | |

Surprisingly, the breakthrough times for the combined structure were many times greater than the sum of the breakthrough times observed in Examples 1 and 2.

EXAMPLE 4

The structure of Example 1 was tested for permeation by toluene using the same methods and test conditions as used for Example 1. Three material samples were tested and the following results were obtained:

|  | Cell 1 | Cell 2 | Cell 3 |
| --- | --- | --- | --- |
| Sample Thickness | 8 mils | 8 mils | 9 mils |
| Breakthrough Time | 4 min. | 8 min. | 4 min. |
| Steady State Permeation Rate | 3810 μg/cm²-hr | 3650 μg/cm²-hr | 4290 μg/cm²-hr |
| Minimum Detection Limit | .02 ppm | .02 ppm | .02 ppm |
| Average Breakthrough Time: | 5.3 min. | | |
| Average Permeation Rate: | 3920 μg/cm²-hr | | |

EXAMPLE 5

The structure of Example 2 was tested for permeation by Toluene using the same methods and test conditions as used for Example 2 except that the column temperature was 150° C. Three material samples were tested and the following results were obtained:

|  | Cell 1 | Cell 2 | Cell 3 |
| --- | --- | --- | --- |
| Sample Thickness | .18 mm | .20 mm | .18 mm |
| Breakthrough Time | 11 min | 286 min | 129 min |
| Permeation Rate | .003 mg/m²-sec | .001 mg/m²-sec | .004 mg/m²-sec |
| Minimum Detection Limit | .02 ppm | .02 ppm | .02 ppm |
| Average Breakthrough Time: | 142 min. | | |
| Average Permeation Rate: | .003 mg/m²-sec | | |

EXAMPLE 6

The structure of Example 3 tested for permeation by toluene using the same methods and test conditions as used for Example 3 except that the column temperature was 150° C. Four material samples were tested and the following results were obtained:

|  | Cell 1 | Cell 2 | Cell 3 | Cell 4 |
|---|---|---|---|---|
| Sample Thickness | 9.5 mils | 9.5 mils | 9.5 mils | 9.5 mils |
| Breakthrough Time | >8 hours | >8 hours | >8 hours | >8 hours |
| Permeation Rate | Undetectable (low) | Undetectable | Undetectable | Undetectable |
| Minimum Detection Limit | .02 ppm | .02 ppm | .02 ppm | .02 ppm |
| Average Breakthrough Time: | >8 hours | | | |
| Average Permeation Rate: | Undetectably low | | | |

Surprisingly, the breakthrough times for the combined structure were many times greater than the sum of the breakthrough times observed in Examples 4 and 5.

EXAMPLE 7

The structure of Example 1 was tested for permeation by methylene chloride using the same methods and test conditions as used for Example 1 except that an 11.7 electron volt lamp was used and the detector temperature was 60° C. Three material samples were tested and the following results were obtained:

|  | Cell 1 | Cell 2 | Cell 3 |
|---|---|---|---|
| Sample Thickness | 8 mils | 8 mils | 9 mils |
| Breakthrough Time | 4 min. | 4 min. | 4 min. |
| Steady State Permeation Rate | 389 μg/cm$^2$-hr | 358 μg/cm$^2$-hr | 385 μg/cm$^2$-hr |
| Minimum Detection Limit | .10 ppm | .10 ppm | .10 ppm |
| Average Breakthrough Time: | 4 min. | | |
| Average Permeation Rate: | 377 μg/cm$^2$-hr | | |

EXAMPLE 8

The structure of Example 2 was tested for permeation by methylene chloride us the same methods and test conditions as used for Example 2 except that the column temperature was 150° C. Three material samples were tested and the following results were obtained:

|  | Cell 1 | Cell 2 | Cell 3 |
|---|---|---|---|
| Sample Thickness | .20 mm | .20 mm | .23 mm |
| Breakthrough Time | 4 min. | 6 min. | 3 min. |
| Steady State Permeation Rate | .6 mg/m$^2$-sec | .7 mg/m$^2$-sec | .3 mg/m$^2$-sec |
| Minimum Detection Limit | .10 ppm | .10 ppm | .10 ppm |
| Average Breakthrough Time: | 4 min. | | |
| Average Permeation Rate: | .5 mg/m$^2$-sec | | |

EXAMPLE 9

The structure of Example 3 was tested for permeation by methylene chloride using the same methods and test conditions as used for Example 3. Four material samples were tested and the following results were obtained:

|  | Cell 1 | Cell 2 | Cell 3 | Cell 4 |
|---|---|---|---|---|
| Sample Thickness | 9.5 mils | 9.5 mils | 9.5 mils | 9.5 mils |
| Breakthrough Time | >8 hours | >8 hours | >8 hours | >8 hours |
| Permeation Rate | Undetectable (low) | Undetectable | Undetectable | Undetectable |
| Minimum Detection Limit | .10 ppm | .10 ppm | .10 ppm | .10 ppm |
| Average Breakthrough Time: | >8 hours | | | |
| Average Permeation Rate: | Undetectably low | | | |

Surprisingly, the breakthrough times for the combined structure were much greater than the sums of the breakthrough times observed in Examples 7 and 8.

EXAMPLE 10

The structure of Example 1 was tested for permeation by benzene using the same methods and test conditions as used for Example 2. Three material samples were tested and the results were obtained.

|  | Cell 1 | Cell 2 | Cell 3 |
|---|---|---|---|
| Sample Thickness | 8 mils | 8 mils | 8 mils |
| Breakthrough | 4 min. | 4 min. | 4 min. |
| Steady State Permeation Rate | 3060 μg/cm$^2$-hr | 3920 μg/cm$^2$-hr | 2940 μg/cm$^2$-hr |
| Minimum Detection Limit | .05 ppm | .05 ppm | .05 ppm |
| Average Breakthrough Time: | 4 min. | | |
| Average Permeation Rate: | 3310 μg/cm$^2$-hr | | |

EXAMPLE 11

The structure of Example 1 was tested for permeation by benzene using the same methods and test conditions as used for Example 1 except that the column temperature was 175° C. Three material samples were tested and the results were obtained:

|  | Cell 1 | Cell 2 | Cell 3 |
|---|---|---|---|
| Sample Thickness | .30 mm | .28 mm | .30 mm |
| Breakthrough Time | 17 min. | 17 min. | 17 min. |
| Steady State Permeation Rate | .002 mg/m$^2$-sec | .002 mg/m$^2$-sec | .002 mg/m$^2$-sec |
| Minimum Detection Limit | .05 ppm | .05 ppm | .05 ppm |
| Average Breakthrough Time: | 17 min. | | |
| Average Permeation Rate: | .002 mg/m$^2$-sec | | |

EXAMPLE 12

The structure of Example 3 was tested for permeation by benzene using the same methods and test conditions as used for Example 3 . Four material samples were tested and the following results were obtained:

|  | Cell 1 | Cell 2 | Cell 3 | Cell 4 |
|---|---|---|---|---|
| Sample Thickness | 9.5 mils | 9.5 mils | 9.5 mils | 9.5 mils |
| Breakthrough Time | >8 hours | >8 hours | >8 hours | >8 hours |
| Permeation Rate | Undetectable (low) | Undetectable | Undetectable | Undetectable |
| Minimum Detection Limit | .05 ppm | .05 ppm | .05 ppm | .05 ppm |
| Average Breakthrough Time: | >8 hours | | | |
| Average Permeation Rate: | Undetectably low | | | |

Surprisingly, the breakthrough times for the combined structure were much greater than the sums of the breakthrough times observed in Examples 10 and 11.

I claim:

1. A material for a chemical protective garment comprising:
   (a) a film comprising a layer of oriented polypropylene homopolymer which is at least about 90% isotactic; and
   (b) a substrate laminated to said first film comprising a polyester layer.

2. The material of claim 1 wherein said polypropylene layer is biaxially oriented.

3. The material of claim 1 wherein said film further comprises a polymer heat seal layer.

4. The material of claim 3 wherein said polymer heat seal layer comprises a random ethylene-propylene copolymer.

5. The material of claim 4 wherein said ethylene-propylene copolymer comprises between about 93-97% propylene and about 3-7% ethylene.

6. The material of claim 1 wherein said film further comprises a primary adhesive layer.

7. The material of claim 6 wherein said primary adhesive layer comprises ethylene-vinyl acetate.

8. The material of claim 6 wherein said film further comprises a secondary adhesive layer.

9. The material of claim 8 wherein said secondary adhesive layer comprises an elastomeric adhesive.

10. The material of claim 1 wherein said substrate comprises:
    (a) a layer of nonwoven polyester adjacent to said film; and
    (b) a layer of spun bonded polyester adjacent to said layer of nonwoven polyester.

11. The material of claim 1 wherein said film further comprises a second film including a layer of ethylene-vinyl alcohol bracketed between two moisture-resistant adhesive layers.

12. The material of claim 11 wherein said ethylene-vinyl alcohol layer and said adhesive layers react chemically to form an interpolymer network.

13. The material of claim 11 wherein:
    (a) said second film is a five layer, high barrier film; and
    (b) the outer layer on each side of said second film is a-polyolefin material.

14. A material for a chemical protective garment comprising:
    (a) a first film comprising a layer of oriented polypropylene homopolymer;
    (b) a second film comprising a layer of ethylene vinyl alcohol bracketed between two moisture-resistant adhesive layers and combined with said first film to form a composite; and
    (c) a substrate laminated to said composite.

15. The material of claim 14 wherein said oriented polypropylene homopolymer is at least about 90% isotactic.

16. The material of claim 14 wherein said ethylene-vinyl alcohol layer and said adhesive layers react chemically to form an interpolymer network.

17. The material of claim 14 wherein said first film further comprises:
    (a) a layer of random ethylene-propylene copolymer; and
    (b) a layer of ethylene-vinyl acetate copolymer;
    (c) such that said oriented polypropylene homopolymer layer is positioned between said random ethylene-propylene copolymer layer and said ethylene-vinyl acetate copolymer layer.

18. The material of claim 14 wherein said second film further comprises two polyolefin layers positioned on both sides of said ethylene vinyl alcohol layer and joined thereto by said adhesive layers.

19. A multilayer film for a chemical protective garment comprising:
    (a) a layer of biaxially oriented polypropylene homopolymer which is at least 90% isotactic;
    (b) a layer of random ethylene-propylene copolymer comprising between about 93-97% propylene and about 3-7% ethylene;
    (c) layer of ethylene-vinyl acetate copolymer; and
    (d) said polypropylene layer sandwiched between said ethylene copolymer layer and said ethylene-vinyl acetate layer.

20. The multilayer film of claim 19 further comprising a barrier structure having a center layer of ethylene-vinyl alcohol bracketed between two moisture-resistant adhesive layers.

21. A protective garment for hazardous chemical environments comprising:
    (a) a segment of material having an edge;
    (b) said material segment including a multilayer film having an intermediate layer of substantially isotactic, biaxially oriented polypropylene homopolymer, a heat seal layer on one side of said oriented polypropylene layer, and an adhesive layer on an opposite side of said oriented polypropylene layer;
    (c) said material segment also including a substrate;
    (d) said multilayer film and said substrate being laminated together; and
    (e) said garment being effective to protect a worker in a hazardous chemical environment.

22. The protective garment of claim 21 further comprising an elastomeric adhesive layer between said multilayer film and said substrate.

23. The protective garment of claim 21 further comprising a five-layer, high barrier film adjacent to said multilayer film and laminated thereto, said high barrier film comprising a center layer of ethylene-vinyl alcohol bracketed between two layers of a moisture-resistant adhesive.

24. The protective garment of claim 22 wherein said substrate comprises:
    (a) an interface layer of nonwoven polyester adjacent to said elastomeric adhesive and laminated thereto; and
    (b) a layer of spun-bonded polyester adjacent to said interface layer and laminated thereto.

* * * * *

UNITED STATES PATENT AND TRADEMARK OFFICE
CERTIFICATE OF CORRECTION

PATENT NO. : 4,924,525
DATED : May 15, 1990
INVENTOR(S) : James E. Bartasis

Page 1 of 2

It is certified that error appears in the above-identified patent and that said Letters Patent is hereby corrected as shown below:

In column 1, line 34, after "garments" please insert --.--.

In column 6, line 32, before "60" please insert --strip--.

IN EXAMPLE 6
In column 8, line 66, before "tested" please insert --was--.

IN EXAMPLE 8
In column 9, line 43, please delete "us" and substitute therefor --using--.

IN EXAMPLE 10
In column 10, line 18, please delete "Example 2" and substitute therefor --Example 1--.

UNITED STATES PATENT AND TRADEMARK OFFICE
CERTIFICATE OF CORRECTION

PATENT NO. : 4,924,525
DATED : May 15, 1990
INVENTOR(S) : James E. Bartasis Page 2 of 2

It is certified that error appears in the above-identified patent and that said Letters Patent is hereby corrected as shown below:

IN EXAMPLE 11

In column 10, line 33, please delete "Example 1" and substitute therefor --Example 2--; in line 35, delete "Example 1" and substitute therefor --Example 2--; and in line 37, before "results" please insert --following--.

IN THE CLAIMS

In claim 19, line 8, before "layer" please insert --a--.

Signed and Sealed this

First Day of December, 1992

Attest:

DOUGLAS B. COMER

*Attesting Officer*    *Acting Commissioner of Patents and Trademarks*